F. G. HOBART.
VALVE FOR GAS ENGINES.
APPLICATION FILED MAY 5, 1906.

923,524.

Patented June 1, 1909.

Witnesses

Inventor
Franklin G. Hobart

UNITED STATES PATENT OFFICE.

FRANKLIN G. HOBART, OF BELOIT, WISCONSIN, ASSIGNOR TO FAIRBANKS, MORSE & COMPANY, OF CHICAGO, ILLINOIS, A CORPORATION OF ILLINOIS.

VALVE FOR GAS-ENGINES.

No. 923,524.

Specification of Letters Patent.

Patented June 1, 1909.

Application filed May 5, 1906. Serial No. 315,377.

*To all whom it may concern:*

Be it known that I, FRANKLIN G. HOBART, a citizen of the United States of America, residing at Beloit, in the county of Rock and State of Wisconsin, have invented certain new and useful Improvements in Valves for Gas-Engines, of which the following is a specification, reference being had therein to the accompanying drawings.

My invention relates to combination check and test valves for explosion engines and consists in a new and useful construction and combination of parts, as will be more particularly hereinafter described and pointed out in the claims.

Figure 1:
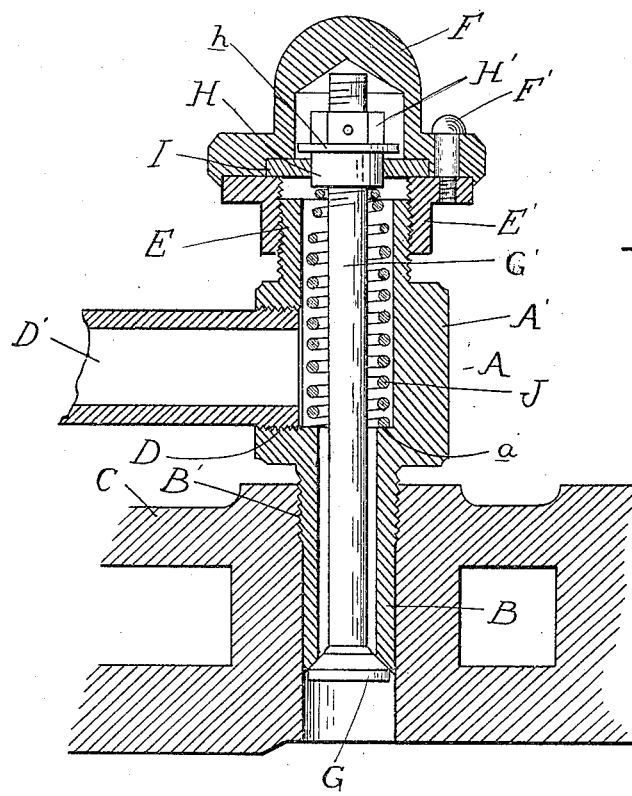
Figure 2:
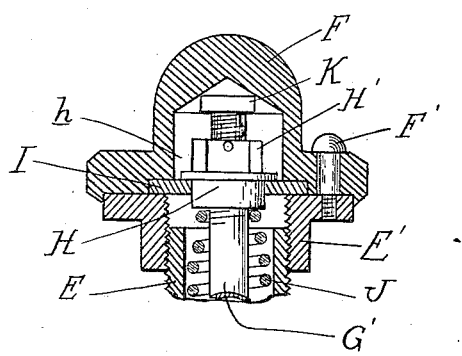

Figure 1 is a longitudinal central section through my improved valve showing the application of the device to a cylinder; Fig. 2 is a fragmentary section showing a modified form.

A is a tubular body member having a bore or hole of different diameters to form the shoulder $a$ therebetween. The central portion A' of the body is preferably hexagonal in cross section to permit the application of a wrench. One end of the body forms a cylindrical projection B and intermediate this end and the portion A' the body is exteriorly threaded at B' for attachment to the cylinder wall C. This cylindrical end of the body member can thus be inserted well through the cylinder wall while only the outer end of the aperture therein need be threaded. In one side of the body is a lateral aperture D preferably tapped for the insertion of a suitable pipe D' for connecting the hollow core with the atmosphere or with gas and air supply as desired. The outer end E of the body is exteriorly threaded for engagement with a bushing E' to which is secured a hollow cap F by means of screws F'.

G is a valve seating on the cylindrical end of the body member. The stem G' of the valve passes through the hollow core of the body and is threaded at its end for engagement with the collar H and the jam nut H' whereby the collar may be adjusted on the stem. The collar H is preferably provided with a flange $h$ for engagement with a ring or collar I through which the body of the collar H passes with sliding engagement. The preferable construction of the collar I consists in forming it of a series of sheet metal washers. This construction gives a desirable elasticity to the collar. The rim of the collar I fits a recess in the inner face of the cap F and the collar is retained therein by the outer face of the bushing E'. The flange $h$ being beyond the collar I, said collar forms a stop for limiting the opening movement of the valve G. When used as a check valve, the valve is yieldingly held to its seat by a spiral spring J, having its inner end bearing against the shoulder $a$ and its outer end against the collar H.

From the above description, it is obvious that by rotating the cap and bushing, the collar I will be adjusted to vary the limit of the opening of valve G or to close the valve positively.

When it is desired to use the device as a test valve or petcock, the spring may be dispensed with, as desired. The bushing E' is screwed down on the member E until the upper end of the stem G' abuts against the inside of the cap F, and the collar H is then adjusted until the flange $h$ engages the ring or collar I. It is obvious that with the parts in this position they are locked against relative vertical movement and any adjustment of the cap F will positively open or close the valve G. If desired a filler block, such as K, may be interposed between the end of the stem and the cap, as shown in Fig. 2.

What I claim as my invention is:

1. In a valve for explosive engines, the combination with a body member having a longitudinal hollow core of different diameters, forming a shoulder therein and having an aperture connected with said hollow core, said body member carrying means intermediate its ends for attachment to the engine, of a valve seated at one end of said body adapted to be automatically opened and closed, a valve stem passing through said hollow core, an adjustable collar on said stem, a yielding member sleeved on said stem and bearing against said collar and said shoulder, and tending to hold said valve to its seat, an adjustable cap inclosing one end of said body member for adjusting the opening and closing movement of said valve, and means for locking said stem and cap against relative vertical movement whereby the adjustment of said cap positively opens or closes said valve.

2. In a valve for explosion engines, the combination with a body member having a hollow core and having a threaded portion intermediate its ends for attachment to the engine, one end of said body member being cylindrical for insertion in the engine, of a valve seating in said cylindrical end, a stem for said valve passing through said hollow core and entirely inclosed within the valve casing, a yielding member tending to hold said valve to its seat, an adjustable cap inclosing the outer end of said valve, the adjustment of said cap being adapted to vary the opening and closing movement of said valve, and means for locking said cap and stem against relative vertical movement, whereby the adjustment of said cap positively opens or closes said valve, for the purpose described.

3. In a valve for explosive engines, the combination with a body member having a longitudinal hollow core of different diameters, forming a shoulder therein, said body member carrying means intermediate its ends for attachment to the engine, of a valve seated at one end of said body, a valve stem passing through said hollow core, an adjustable collar on said stem, a yielding member sleeved on said stem and bearing against said collar and said shoulder and tending to hold said valve to its seat; a bushing adjustably secured to the outer end of said body, a hollow cap removably secured to said bushing and forming a closure for the end of said body, said cap having a recess in its inner face and a collar fitting said recess whereby the adjustment of said cap will vary the limit of opening movement of said valve.

4. In a valve for explosive engines, the combination with a body member having a longitudinal hollow core of different diameters forming a shoulder therein, the central portion of said body member being polygonal in cross section to form a wrench hold, and means intermediate the ends for attachment to the engine, of a valve seated at one end of said body adapted to be automatically opened and closed, a valve stem passing through said hollow core, a yielding member tending to hold said valve to its seat bearing upon said shoulder, a bushing adjustably secured to the outer end of said body member, a hollow cap removably secured to said bushing, and means on said cap and valve stem whereby the adjustment of said cap will vary the limit of the opening or closing movement of said valve, for the purpose described.

5. In a valve for explosive engines, the combination with a body member having a longitudinal hollow core of different diameters forming a shoulder therein and having an aperture connected with said hollow core, said body member carrying means intermediate its ends for attachment to the engine, of a valve seated at one end of said body adapted to be automatically opened and closed, a valve stem passing through said hollow core, an adjustable collar on said stem, a yielding member sleeved on said stem and bearing against said collar and said shoulder and tending to hold said valve to its seat, and an adjustable cap for said body member with which said collar has a sliding engagement adapted to vary the opening and closing movement of said valve.

In testimony whereof I affix my signature in presence of two witnesses.

FRANKLIN G. HOBART.

Witnesses:
  E. O. POWERS,
  A. B. GARDNER.